(12) United States Patent
Wolters et al.

(10) Patent No.: US 9,181,032 B2
(45) Date of Patent: Nov. 10, 2015

(54) ROLLER CONVEYOR COMPRISING A BEARING ELEMENT WITH SHOULDER

(75) Inventors: Thomas Wolters, Schwalmtal (DE); Siegmund Dudek, Heinsberg (DE)

(73) Assignee: Interroll Holding AG (CH)

( * ) Notice: Subject to any disclaimer, the term of this patent is extended or adjusted under 35 U.S.C. 154(b) by 134 days.

(21) Appl. No.: 13/990,055

(22) PCT Filed: May 31, 2012

(86) PCT No.: PCT/EP2012/002315
§ 371 (c)(1),
(2), (4) Date: May 29, 2013

(87) PCT Pub. No.: WO2012/171614
PCT Pub. Date: Dec. 20, 2012

(65) Prior Publication Data
US 2013/0248333 A1 Sep. 26, 2013

(30) Foreign Application Priority Data
Jun. 14, 2011 (DE) .......... 10 2011 104 189

(51) Int. Cl.
| | |
|---|---|
| B65G 13/07 | (2006.01) |
| B65G 13/02 | (2006.01) |
| B65G 13/071 | (2006.01) |
| B65G 39/12 | (2006.01) |
| B65G 51/03 | (2006.01) |

(52) U.S. Cl.
CPC .............. *B65G 13/02* (2013.01); *B65G 13/071* (2013.01); *B65G 39/12* (2013.01); *B65G 51/03* (2013.01); *B65G 2207/24* (2013.01)

(58) Field of Classification Search
CPC ....... B65G 13/071; B65G 13/02; B65G 13/07
USPC .......................................... 198/790
See application file for complete search history.

(56) References Cited

U.S. PATENT DOCUMENTS

| | | | | |
|---|---|---|---|---|
| 2,827,153 | A | * | 3/1958 | Olk et al. ........ 198/790 |
| 3,861,517 | A | * | 1/1975 | Theijsmeijer ...... 198/790 |

(Continued)

FOREIGN PATENT DOCUMENTS

| | | |
|---|---|---|
| DE | 1 756 448 | 8/1970 |
| DE | 25 00 822 | 9/1975 |

(Continued)

OTHER PUBLICATIONS

German Examination Report of Dec. 15, 2011.

(Continued)

*Primary Examiner* — Gene Crawford
*Assistant Examiner* — Thomas Randazzo
(74) *Attorney, Agent, or Firm* — Gerald E. Hespos; Michael J. Porco; Matthew T. Hespos

(57) ABSTRACT

A conveyor-section bearing element (50) for fitting to a conveyor frame (10) of a roller conveyor (1), wherein the conveyor-section bearing element (50) has at least one bearing site (54) for bearing a conveyor roller (20) on the conveyor frame, wherein the conveyor-section bearing element (50) further has at least one roller axle for bearing a carrier or support roller (32; 33), as well as a retrofit kit and a roller conveyor (1) comprising such a conveyor-section bearing element (50).

5 Claims, 4 Drawing Sheets

(56) References Cited

U.S. PATENT DOCUMENTS

| | | | | |
|---|---|---|---|---|
| 3,888,343 | A | * | 6/1975 | Snyder ............... 198/780 |
| 4,091,916 | A | * | 5/1978 | Warner ............... 198/790 |
| 4,096,942 | A | | 6/1978 | Shepherd |
| 4,196,312 | A | * | 4/1980 | DeGood et al. ........... 198/781.1 |
| 5,209,342 | A | * | 5/1993 | vom Stein ............ 198/790 |
| 6,161,681 | A | | 12/2000 | Kalm |
| 6,189,672 | B1 | | 2/2001 | Schut |
| 6,390,286 | B1 | * | 5/2002 | Nguyen et al. ........... 198/781.08 |
| 6,523,664 | B2 | * | 2/2003 | Shaw et al. ............ 193/35 R |
| 2002/0050444 | A1 | | 5/2002 | Tapp |
| 2002/0134649 | A1 | | 9/2002 | Nguyen et al. |
| 2004/0099511 | A1 | | 5/2004 | Nas et al. |
| 2007/0248294 | A1 | | 10/2007 | Jager |
| 2009/0161999 | A1 | * | 6/2009 | Crooks ............... 384/428 |
| 2011/0089002 | A1 | * | 4/2011 | Anderson ............... 198/787 |
| 2012/0006657 | A1 | * | 1/2012 | Karas et al. ............ 198/790 |

FOREIGN PATENT DOCUMENTS

| | | |
|---|---|---|
| DE | 89 04 162.3 | 11/1989 |
| DE | 10 2005 024 434 | 7/2009 |
| EP | 0 931 737 | 7/1999 |
| FR | 2 555 557 | 5/1985 |
| FR | 2 931 809 | 12/2009 |
| GB | 1 168 280 | 10/1969 |
| WO | 2006/114233 | 11/2006 |

OTHER PUBLICATIONS

International Search Report of Jan. 18, 2013.
Canadian Office Action Jun. 16, 2014.

* cited by examiner

ROLLER CONVEYOR COMPRISING A BEARING ELEMENT WITH SHOULDER

BACKGROUND

1. Field of the Invention

The present invention relates to a novel construction of driven roller tracks and to the components thereof.

2. Description of the Related Art

Thanks to many variants, roller tracks are the ideal way of transporting various goods.

Among others, roller conveyors are also used to connect belt conveyors on a straight section or in curves. This often requires buffers capable of compensating for different clock cycles of machines. Here, accumulating conveyors with which an accumulating function can be obtained are sometimes used, which makes sense particularly for interlinking of machines.

Among others, roller tracks can be used as light roller tracks or as standard roller conveyors.

Light roller tracks, which are also referred to as minute roller conveyors, serve to transport small, light goods to be conveyed, in particular over short distances. Generally, light roller tracks transport general cargo of at most 15 kg per meter at a conveyor speed of approximately 1 m/s. For example, a light roller conveyor having a length of 2 meters can be comprised of 57 rollers, each having a diameter of 30 mm (30 mm roller) and a roller pitch of 35 mm, so that also small goods can be transported securely without getting caught in the roller track.

Standard roller conveyors have rollers with a 50 mm diameter (50 mm roller) and a roller pitch of approximately 75 mm and more. The rollers are made of plastics or metal. Roller conveyors are stationary units in conveying engineering, which move general cargo over an assembly of rollers.

There are different drive concepts for driven roller tracks.

In the case of straight conveyors, chains are used at higher driving torque and lower speeds, whereas poly-V belts are used at medium torque and round-section belts at lower torque. Sometimes, flat belts are used as well. The arrangement of the belt can be in a tangential manner to the driven rollers or in a wrapping manner to the driven rollers. In the latter case, a drive can be accomplished from roller to roller or by means of a driveshaft.

With a tangential drive, the belt contacts the roller tangentially. Here, the belt is supported either by support rollers or by means of a slide rail, so that the required normal force between the conveyor roller and the belt is achieved. Depending on the belt used and the torque to be transmitted, a more or less strong pretension of the belt is required.

In particular in the case of the tangential drive, the belts have to be shortened to the required length and welded together on the spot, or additional idler pulleys and complex tensioning devices have to be used if prefabricated drive belts of a predetermined length are to be used. It has to be taken into account that only a few conveying means can be shortened to the desired length anyway and that the welding quality is difficult to ensure on the spot.

For a targeted effect, the transmission element always has to be tensioned strongly and be retensioned regularly. Too low a tension can lead to strong strand vibrations or to a skipping of the teeth on the tooth lock washer. Too high forces cause a strong load on the bearings and the belt, and influence the gear components negatively by signs of wear. Moreover, high forces, a strong rigidity of the belt, a plurality of belt redirections and/or the use of slide rails lead to a strong friction loss, to wear, and to an unnecessary energy loss.

In the case of a roller-to-roller drive, one roller connected to a drive motor drives the subsequent roller by means of a transmission element in a usually nonpositive manner. A further transmission element can drive the next subsequent roller, etc. Here, the transmission elements wrap around half of the roller each.

For a large number of rollers, many transmission elements are required, so that friction and thus energy consumption and wear increase. For a roller conveyor having a length of 2 m and rollers of 30 mm, approximately 60 belts are required. The speed loss has a negative effect here as well, since due to the slip during each transmission from belt to roller the last roller can exhibit a clearly different rotation speed than the first driven roller. In order to avoid these disadvantages, motorized rollers are used to some extent. These motorized rollers are integrated across the roller track section, so that one motorized roller, via round-section belts, drives e.g. four rollers in front of and after the motorized roller in a continuous manner.

A drive by means of a driveshaft also requires many wraps of the transmission element, which leads to corresponding friction losses. Moreover, the assembly of the transmission element is complex.

Therefore, for driven roller tracks, in particular for light roller tracks in which all or at least a major part of the rollers are/is to be driven, there is the problem that a plurality of driven rollers, having their own drive unit, can only be realized in a complex and expensive manner. Driven roller tracks, in which a plurality of rollers is driven via a drive unit, require a comparatively strong drive unit, since the power transmission from the drive unit involves friction and thus entails high energy consumption. In addition, a friction-involving operation often leads to wear and to a premature failure of components of the roller track.

The above problems occur both with straight conveyors and with curved conveyors, curved conveyors being more likely problematic, since a drive along a curve requires a corresponding redirection of the transmission element or transmission elements, which can lead to more friction loss and wear.

It therefore is the object of the invention to provide an easy-to-assemble roller conveyor and the components thereof, which are easy to mount, versatile in use, reliable, and consume little energy during operation.

SUMMARY OF THE INVENTION

A first aspect of solving the object relates to a conveyor-section bearing element for fitting to a conveyor frame of a roller conveyor, wherein the conveyor-section bearing element has at least one bearing site for bearing a conveyor roller on the conveyor frame, wherein the conveyor-section bearing element further has at least one roller axle for bearing a carrier or support roller.

The roller axle can be formed integrally on the conveyor-section bearing element.

In one embodiment of the above-described conveyor-section bearing element, the bearing site can be formed as an elongated recess in order to enable a floating support.

The bearing site can have two parallel bearing site boundary surfaces. The distance of the bearing site boundary surfaces can correspond to the diameter of an axle end of a conveyor roller to be supported on the conveyor-section bearing element. Thus, the position of the conveyor roller transverse to the conveying direction can be set in a defined manner, and at the same time a floating support perpendicular to the conveying plane can be enabled, the axle end of the conveyor roller in the bearing site having freedom of movement perpendicular to the conveying plane. Accordingly, the bearing site can be formed as an elongated hole. The elongated hole can be formed as a through hole or as a blind hole. The bearing sites can have a concave resting surface.

In a further embodiment of the above-described conveyor-section bearing element, the bearing site can have an elongated shape and be closed at the top.

According to a further embodiment of the above-described conveyor-section bearing element, the roller axle can be formed as a carrier roller axle and extend in a direction such that the rotation axis of a carrier roller to be arranged on the carrier roller axle extends substantially in parallel with a rotation axis of a conveyor roller to be supported in the bearing site.

Accordingly, the carrier roller to be fitted can have a substantially horizontal rotation axis. Since e.g. in curved conveyors conical rollers are usually used, the rotation axis of the conveyor roller can be slightly tilted with respect to the conveying plane. Substantially horizontal thus also includes the support of the carrier rollers in which the rotation axes of the carrier rollers is parallel to a tangential plane, which is tangent to the roller surfaces from above or from below, or a support of the carrier rollers in which the rotation axes of the carrier rollers is within this area.

In one of the above-described conveyor-section bearing elements according to a further embodiment, the conveyor-section bearing element can have a second roller axle, which is formed as a support roller axle and which extends in a direction such that the rotation axis of a support roller to be arranged on the support roller axle extends substantially perpendicular to a conveying plane.

In this context, the conveying plane is the tangential plane that contacts the top side of the conveyor rollers. In this context, substantially horizontal also includes a position of the support roller axle which is slightly tilted outward. As described above, conical conveyor rollers can be used in curved conveyors, so that the rotation axis of the support roller can be slightly tilted with respect to the conveying plane. Therefore, the support roller axle can be arranged such that the rotation axes of the support rollers to be supported is perpendicular to the rotation axes of the carrier rollers or perpendicular to one of the tangential planes, which are tangent to the rollers from above or from below. The carrier rollers can be supported such that the rotation axis of the respective carrier roller is within the area between the upper and lower tangential planes.

In yet a further embodiment of one of the above-described conveyor-section bearing elements, the conveyor-section bearing element including the at least one bearing site, the at least one support roller axle and/or the at least one carrier roller axle can be formed integrally as an injection-molded part.

A second aspect of solving the object relates to a retrofit kit for a roller conveyor comprising a plurality of conveyor-section bearing elements of one of the embodiments according to the first aspect, as well as fixing elements for fixing the conveyor-section bearing element to a conveyor frame, a plurality of conveyor rollers, and a drive system comprising at least one drive belt, a plurality of carrier rollers, at least one idler pulley, and at least one driving roller connected to a drive motor, e.g. an electric motor.

A third aspect of solving the object relates to a roller conveyor having a conveyor frame and a plurality of conveyor rollers rotatably supported in the conveyor frame, and a plurality of conveyor-section bearing elements of one of the embodiments according to the first aspect, wherein several conveyor-section bearing elements are fixed to a side profile of the conveyor frame by at least one fixing element, the roller conveyor further comprising a drive system with at least one drive belt, which is tensioned between two idler pulleys and the upper strand of which is supported between the idler pulleys via a plurality of carrier rollers, as well as a plurality of conveyor rollers resting on the upper strand of the drive belt in a floating manner.

The roller conveyor can be a curved roller conveyor. The drive belt can have a round cross section, in particular a circular cross section. A drive belt having a round cross section can also be referred to as a round-section belt. The drive belt can be formed as a PU round-section belt using the material polyurethane. The term "resting in a floating manner" means that the conveyor roller rests on the drive belt such that the drive belt contacts the conveyor roller tangentially from below.

In one embodiment of such a roller conveyor, the at least one fixing element, with which several conveyor-section bearing elements are fixed to the side profile of the conveyor frame, can be designed as a console-like bent sheet metal part, in particular as an elongated sheet metal strip, which in the transverse direction of the sheet metal strip has a fixing area and a resting area extending next to each other, the resting area being chamfered approximately at right angles in relation to the clamping area.

In a further embodiment of an above-described roller conveyor, the roller conveyor can be formed as a curved roller conveyor, wherein the drive belt runs along on the side opposite to the conveyor rollers on a plurality of carrier rollers and is supported by a plurality of support rolls on the curve inner side, so that the drive belt runs a polygon curve following the conveying curve.

The term curved roller conveyor refers to a roller conveyor that conveys goods to be conveyed along a curve, in particular along a circle segment. The conveyor frame of the curved roller conveyor can have a circularly bent inner profile on which the conveyor rollers are supported on the curve inner side, wherein the rotation axes of the conveyor rollers coincide with the radius vectors that start from the circle center of the circle associated with the circularly bent inner profile. The conveyor frame of the curved roller conveyor can further have a circularly bent outer profile on which the conveyor rollers are supported on the curve outer side. The inner profile and the outer profile can have the same circle center. The circle segment can be a 30° segment, a 45° segment, a 60° segment, or a 90° segment. Other angular ranges of a curved roller conveyor are conceivable as well. The area of the drive belt on which the conveyor rollers rest can be referred to as the upper strand or tight side. The drive belt side opposite to the conveyor rollers refers to the bottom side of the upper strand of the drive belt.

The carrier rollers of the roller conveyor can be supported on the conveyor-section bearing element such that their rotation axes extend in parallel with a plane which is tangent to the roller surfaces of the conveyor rollers on the conveying side. In other embodiments, the curve outer sides of the carrier rollers can be slightly inclined downward.

The resting console of a described curved roller conveyor, as described above, can be formed of a chamfered, elongated sheet metal strip, which extends in a bent manner along a circular line corresponding to the circularly bent inner profile, so that the resting console can be easily fixed to the inner profile.

In yet a further embodiment of one of the above-described roller conveyors, the ratio between the number of driven conveyor rollers F and the number of support rollers S can correspond to the relation $0.5 \leq F/S \leq 4$.

The smaller the ratio is selected, the finer the polygon curve, or line, along which the drive belt runs is stepped. This ensures that the drive belt course in the area of the contact point with the surface of the conveyor roller comes closer to the ideal, lowest-friction and thus lowest-wear drive belt course. The lowest-friction drive belt course corresponds, in the contact point, to a mathematical tangent on the surface of the conveyor roller surface. Since the conveyor roller surface of a conveyor roller of a curved conveyor is usually formed as a cone, such a mathematical tangent would run in a plane perpendicular to the rotation axis of the cone and contacting the circular cross section of the cone. Such an ideal course can be obtained e.g. if respectively one support roller is arranged on a circular line with the center of the circle of curvature of the conveying curve and centrally between two conveyor rollers and/or centrally between to carrier rollers. If a support roller is not arranged centrally between the carrier rollers, this ideal ratio with respect to the carrier rollers is not achieved fully. In this case, however, it has turned out that in such an embodiment the round drive belt is more stable in its position and has fewer tendencies to come away from its guided position, so that a more trouble-free operation can be ensured. Moreover, it has been seen in tests that a ratio of F/S=2 results in a sufficiently finely stepped polygon curve.

Accordingly, in one embodiment of such a curved roller conveyor, a support roller and a carrier roller are fixed to every second conveyor-section bearing element. The respectively neighboring conveyor-section bearing elements are formed identically and can therefore also have a carrier roller axle and a support roller axle. These roller axles are not provided with carrier rollers or support rollers in this embodiment though.

According to a further embodiment of one of the above-described roller conveyors, the conveyor-section bearing elements can each have a carrier roller axle and a support roller axle, wherein both the carrier roller axle and the support roller axle of a conveyor-section bearing element are arranged along the course of the drive belt in a displaced manner starting from the position of the bearing site of the conveyor-section bearing element.

In a roller conveyor according to yet a further embodiment of one of the above-described roller conveyors, both the carrier roller axle and the support roller axle of the respective conveyor-section bearing element can be arranged starting from the position of the bearing site of the conveyor-section bearing element in a manner displaced by approximately half a conveyor roller diameter. Half a conveyor roller diameter refers to the conveyor roller diameter of the conveyor roller in the curve inner side area of the conveyor roller. This configuration ensures that the carrier rollers and the support rollers are each arranged centrally between two rollers. The carrier rollers and the support rollers can be arranged starting from the position of the bearing site of the conveyor-section bearing element in a manner displaced in the same direction, so that the carrier rollers and the support rollers lie on top of each other and contact the drive belt along its course at the same point each.

Here, the rotation axes of the support rollers can have a perpendicular course or a course inclined toward the curve outer side. A perpendicular course of the rotation axes of the support rollers means that the rotation axes of the support rollers are parallel to each other. In the case of cylindrical rollers, this has the effect that no force components, which are directed toward the rotation axis of the support roller, result from the pressing force of the drive belt onto the support roller. Thus, the drive belt is prevented from slipping off. In this case, the round-section belt will only be held down by the weight of the conveyor rollers which rest on it. A course inclined toward the curve outer side refers to a course in which the conveyor-roller-side end of the rotation axis is inclined toward the outer side of the conveying curve. With a cylindrical support roller, a force component of the pressing force between the drive belt and the support is generated, which presses the drive belt down onto the carrier rollers, so that in this embodiment as well the drive belt is prevented from slipping off. Since the drive belt is not only tangent to the support rollers but wraps around them by an angle, although a small angle, an inclination of the support rollers causes a slight relative movement and thus friction and wear between drive belt and support roller. The smaller the inclination of the rotation axis of the support roller, the less the relative movement that occurs. An inclination between 0° and 5°, in particular an inclination between 0° and 2°, has turned out to be unproblematic with regard to friction and wear. Alternatively or in addition to the corresponding inclination of the roller axes of the carrier rollers or the support rollers, the surfaces of the carrier rollers and/or of the support rollers can be configured conically, so that the belt is prevented from slipping off.

In a further embodiment of one of the above-described roller conveyors, the conveyor-section bearing elements can each have a console contact surface corresponding to the fixing element and a side profile contact surface corresponding to the side profile.

One or more fixing holes can be provided on the console contact surface. Thus, the conveyor-section bearing elements can be screwed together with the fixing element, for example. Moreover, a position protrusion or a plurality of position protrusions can be arranged on the console contact surface. A position protrusion can engage a corresponding position recess on the fixing element and thus ensure a defined position of the respective conveyor-section bearing element in relation to the fixing element. The side profile contact surface can be formed concavely, the course of such a concave side profile contact surface corresponding to the surface course of the side profile. With such a side profile contact surface, optionally in cooperation with a position protrusion, a defined position of the respective conveyor-section bearing element in relation to the fixing element can be ensured as well.

In yet a further embodiment of one of the above-described roller conveyors, the support rollers and/or the carrier rollers can be configured as rollers having circular cylindrical or circular cone-shaped surfaces.

This surface geometry has the effect that the contact between the drive belt and the carrier rollers and support rollers in a direction transverse to the course of the drive belt only happens at one point of the respective roller surface if a deformation of the drive belt or of the rollers due to the surface pressing is neglected. Since in this way several points of contact of the drive belt with one of the rollers are prevented, points of contact with different relative speeds can be prevented as well. In this way, friction and wear of rollers and drive belt can be reduced. The support rollers and/or the carrier rollers can further be configured as rollers without ribs. A rib is a protrusion on the end face of a roller, which is to prevent the drive belt from slipping off the roller. In the case of contact of the drive belt on the rib of a roller, a different relative movement and thus friction and wear can occur as well. These disadvantages can be avoided with a carrier roller that has no rib on the curve inner side. In addition, carrier rollers not having a rib on the curve outer side of the respective carrier roller have the advantage of a particularly simple assembly of the drive belt, which does not have to be forced through the narrow gap between carrier roller rib and conveyor rollers when being assembled.

In a further embodiment of the described roller conveyor, the curved roller conveyor can further have at least one idler pulley having a concave resting surface. A idler pulley as defined herein refers to a roller that is arranged at the frontmost or rearmost point of the upper strand in the conveying direction and that redirects the upper strand downward or coming from below toward the lower strand. A second idler pulley can be configured either drivelessly or as a driving roller. In the case of a second driveless idler pulley, the drive can be provided in the area of the lower strand. Such a drive in the area of the lower strand can have a driving roller with an oblique or perpendicular rotation axis, so that particularly small conveyor section widths can be realized.

In one embodiment, in which the second idler pulley is formed as the driving roller, the rotation axis of the driving roller can be parallel to the radius that extends from the curve center to the center of the driving roller. The driving roller can be connected to an electric motor connected to the driving roller in the axial direction at the driving roller. The driving roller can be formed as a driven conveyor roller, for example. A driven conveyor roller refers to a conveyor roller in which an electric motor is arranged in the interior of the cylindrical roller casing and drives the roller casing. This type of driven conveyor rollers has a small diameter and thus little space requirement in the radial direction. Moreover, driven conveyor rollers are produced in large quantities, so that these drives are available at reasonable prices.

In one embodiment of the roller conveyor as a curved roller conveyor, the curved roller conveyor can further have a lower strand idler pulley arranged such that a first part of the lower strand, which coming from the first idler pulley leads to the lower strand idler pulley, runs along a straight line being in a plane that is perpendicular to the rotation axis of the first idler pulley and that passes through the drive belt in the area of the first idler pulley.

In such a curved roller conveyor, only one lower strand idler pulley can be provided. This single lower strand idler pulley can be arranged with respect to the second idler pulley such that a second part of the lower strand, which coming from the second idler pulley leads to the lower strand idler pulley, runs along a straight line being in a plane that is perpendicular to the rotation axis of the second idler pulley and that passes through the drive belt in the area of the second idler pulley. The rotation axis of the lower strand idler pulley can be perpendicular to the conveying plane.

In one embodiment, in which the second idler pulley is formed as a driveless idler pulley, the curved roller conveyor can have a driving roller arranged in the area of the lower strand.

The driving roller arranged in the area of the lower strand can have a substantially perpendicular rotation axis or a rotation axis being oblique by more than 5° with respect to the conveying plane. This embodiment offers the advantage, in particular in the case of an oblique rotation axis, that the driving roller only has little space requirement transverse to the conveying plane. In this way, particularly narrow roller conveyors can be realized.

A further embodiment of such a curved roller conveyor can have at least one lower strand idler pulley, which is arranged in the area of the lower strand such that the lower strand wraps around the driving roller at least 180°.

Here, a single lower strand idler pulley can be sufficient to let the lower strand pass along the meander, so that the lower strand wraps around the driving roller at least 180°. This single lower strand idler pulley can be arranged with respect to the first idler pulley such that a part of the lower strand, which coming from the first idler pulley leads to the lower strand idler pulley, runs along a straight line being in a plane that is perpendicular to the rotation axis of the idler pulley and that passes through the drive belt in the area of the first idler pulley. In this case, the driving roller can be arranged such that the lower strand wraps around the lower strand idler pulley more than 180° and runs toward the driving roller. A middle part of the lower strand, in this case, extends between the lower strand idler pulley and the driving roller. A second part of the lower strand, which coming from the second idler pulley leads to the driving roller, can run along a straight line being in a plane that is perpendicular to the rotation axis of the second idler pulley and that passes through the drive belt in the area of the second idler pulley.

In another embodiment, in which the second idler pulley is formed as a driveless idler pulley, two lower strand idler pulleys, which are arranged accordingly and redirect the lower strand toward the driving roller, can be provided, so that the desired wrap angle at the driving roller is obtained. Here, the driving roller can be arranged between the two lower strand idler pulleys, i.e. in the area of the lower strand that extends between the two lower strand idler pulleys. In this embodiment as well, a first part of the lower strand, which coming from the first idler pulley leads to the first lower strand idler pulley, can run along a straight line being in a plane that is perpendicular to the rotation axis of the idler pulley and that passes through the drive belt in the area of the first idler pulley. Correspondingly, in this embodiment, a second part of the lower strand, which coming from the second idler pulley leads to the second lower strand idler pulley, can run along a straight line being in a plane that is perpendicular to the rotation axis of the second idler pulley and that passes through the drive belt in the area of the second idler pulley.

In the following, individual embodiments for solving the object will be described by way of example with reference to the figures. The individual, described embodiments partly include features that are not absolutely necessary for realizing the claimed subject matter, but which provide characteristics desired for specific applications. Thus, embodiments not including all features of the embodiments described below are also considered to be disclosed by the described technical teaching. In order to avoid unnecessary repetitions, specific features will only be mentioned with respect to individual embodiments described in the following. It is pointed out that the individual embodiments are not to be contemplated only individually, but also in combination. From this combination, the skilled person will see that individual embodiments can be modified by incorporating one or more features of other embodiments. It is pointed out that a systematic combination of individual embodiments with one or more features described with respect to other embodiments can be desirable and expedient, and therefore is to be taken into consideration and be considered to be comprised by the description.

BRIEF DESCRIPTION OF THE DRAWINGS

FIG. 1b shows a part of FIG. 1a.

FIG. 2b shows a part of FIG. 2a.

DETAILED DESCRIPTION OF THE PREFERRED EMBODIMENTS

Figure 1A:
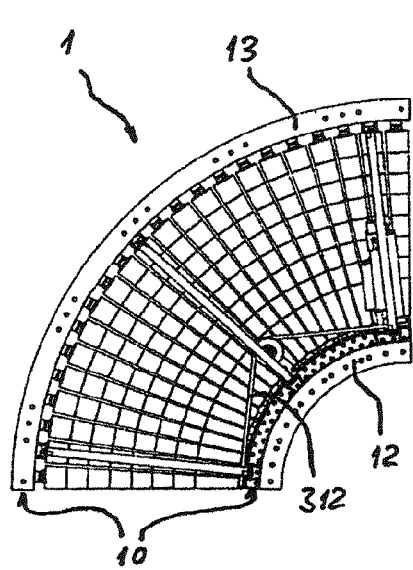
FIG. 1a shows a first embodiment of a roller conveyor from below.
Figure 1B:
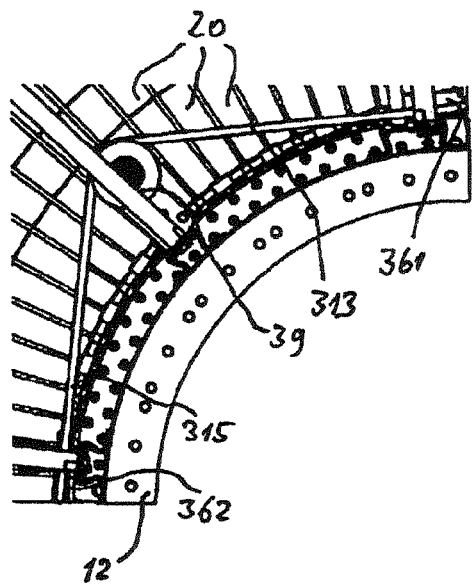
Figure 1C:
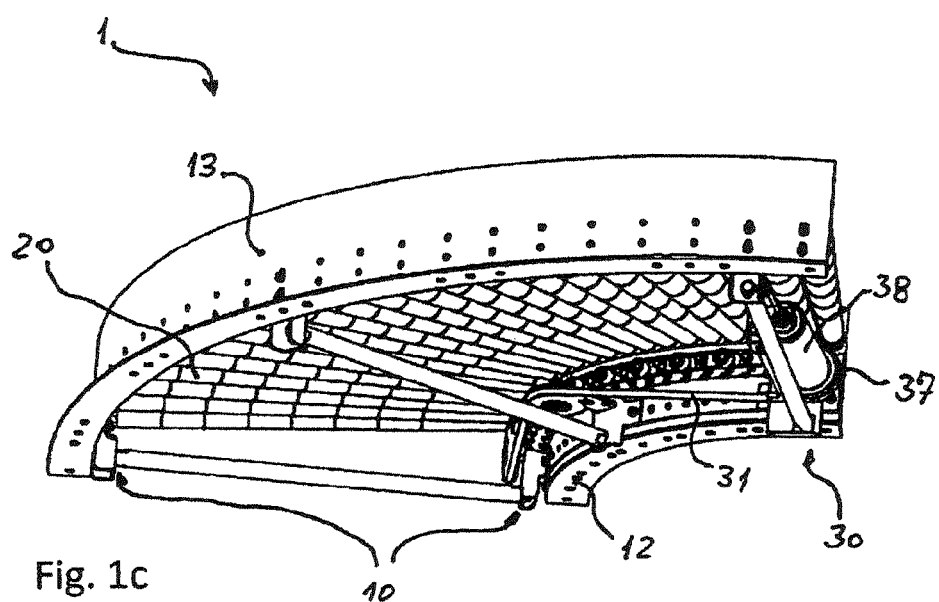
FIG. 1c shows the first embodiment of the roller conveyor of FIG. 1a in perspective view from obliquely below.
Figure 2A:
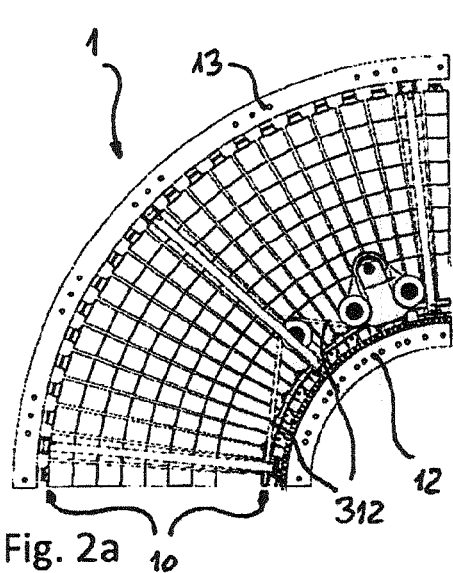
FIG. 2a shows a second embodiment of a roller conveyor from below.
Figure 2B:
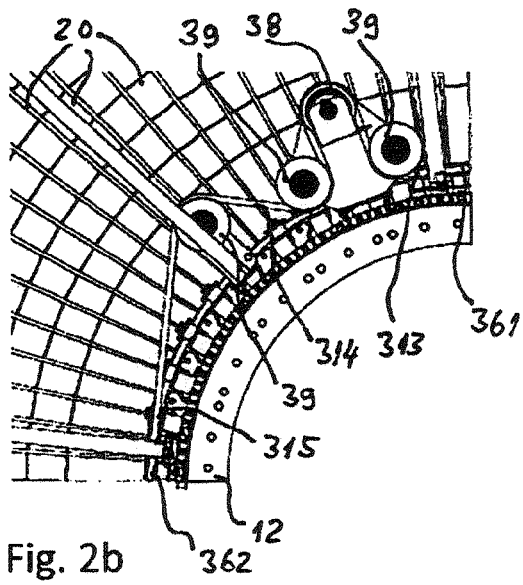
Figure 2C:
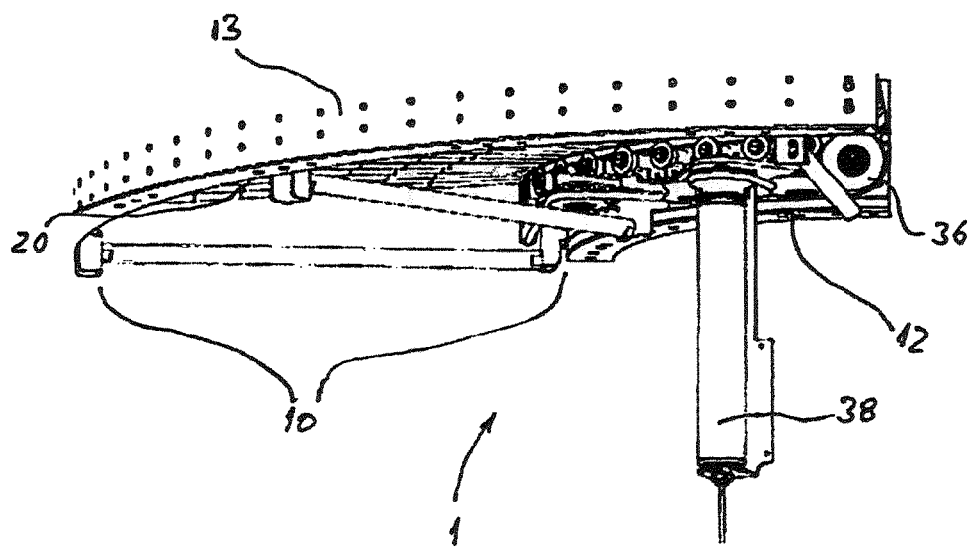
FIG. 2c shows the second embodiment of the roller conveyor of FIG. 2a in perspective view from obliquely below.

FIGS. 1a to 1c and FIGS. 2a to 2c show two different embodiments of a roller conveyor, which are each formed as a curved roller conveyor 1, the first embodiment comprising a lying drive motor 38 and the second embodiment comprising an upright drive motor 38. FIG. 1 and FIG. 2a each show the entire curve segment from the bottom side of the roller conveyor 1. FIGS. 1b and 2b each show an enlarged part in the same viewing direction. FIGS. 1c and 2c show the respective curve segment in perspective view from obliquely below.

In the illustrated embodiment, the drive motor 38 is formed in the form of a driven conveyor roller having a driving roller 37 fixed to one axial end thereof. Driven conveyor rollers refer to conveyor rollers that are used as conveyor rollers in roller conveyors and that comprise a drive unit, in particular an electric motor, inside the cylindrical conveyor roller casing. This type of driven conveyor rollers is produced in large quantities and is thus available on the market at reasonable prices. Moreover, compared to other drive motors, driven conveyor rollers have a relatively small diameter, which results in a space-saving construction in particular in the case of the horizontal arrangement of the drive motor 38. In the illustrated embodiment, these driven conveyor rollers are not used as conveyor rollers in a literal sense, since they are arranged below the conveying plane and do not directly contact the goods to be conveyed on the roller conveyor 1.

In both embodiments, the roller conveyor 1 has a conveyor frame 10 having an inner profile 12 and an outer profile 13. Both the inner profile 12 and the outer profile 13 have a curve-shaped course extending along a portion of a circular line in the illustrated embodiments. Here, the circular lines of both the inner profile 12 and the outer profile 13 have the same center, which can also be referred to as the curve center. The illustrated curve segments each describe a 90° segment. Depending on the field of application, curved roller conveyors can also cover different angles.

A plurality of conveyor rollers 20 is arranged between the inner profile 12 and the outer profile 13 along the conveyor section. To support the conveyor rollers, a plurality of conveyor-section bearing elements 50 is provided along the inner profile 12 and a plurality of curve outer side conveyor-section bearing elements 60 is provided along the outer profile 13, which will be described in detail in the following with reference to the other figures.

Both embodiments illustrated comprise a drive belt 31 having a round cross section. The drive belt 31 can also be referred to as a round-section belt. Compared to drive belts having different cross sections, round-section belts have the advantage that they can be bent in arbitrary directions transverse to the longitudinal extension of the belt, so that they can be redirected well in different directions.

In both embodiments, the drive belts 31 are formed as continuous belts, which each have an upper strand 311 and a lower strand 312. The term upper strand 311 refers to the upper portion of the drive belt 31, which runs above the idler pulleys 36. The term lower strand 312 refers to the part of the continuous belt which runs back below the idler pulleys 36 in the illustrated embodiment.

In both embodiments, the upper strand 311 passes on the curve inner side in the area of the inner profile 12 substantially along a portion of a circular line. To this end, a plurality of support rollers 33 supporting the upper strand 311 toward the curve inner side is provided in the area of the inner profile 12. The arrangement of the support rollers 33 will be described in detail with reference to the other figures. Since the upper strand 311 between each support roller 33 runs substantially along a straight line, the course of the upper strand 311 can also be described as a polygon curve. The more support rollers 33 are provided, the more finely the polygon curve is stepped and the more the polygon curve is approximated to a circular line. In the illustrated embodiments, one support roller 33 is provided every two conveyor rollers 20. It is also conceivable that one support roller 33 is provided between two conveyor rollers 20 each, or that only one support roller 33 is provided every three or four conveyor rollers 20.

The curve inner side areas of the conveyor rollers 20 rest on the upper strand 311 tensioned along the curve line. Each of the conveyor rollers 20 is substantially perpendicular to the course of the curve line. Since the course of the upper strand 311 is strongly approximated to the curve line in this area in a polygon-like manner, the upper strand 311 is tangent to each of the conveyor rollers 20 substantially perpendicularly. Therefore, during operation of the roller conveyor 1, the relative movement between the conveyor rollers 20 driven by the upper strand 311 can be described as a substantially rolling transmission, since the relative movement does almost not have a movement component in the longitudinal direction of the respective conveyor roller 20. By means of this configuration, friction and wear of the drive belt can be minimized.

In order to enable a smooth and planar course of the conveying plane and a constant transmission of the driving forces between drive belt 31 and conveyor rollers 20, a plurality of carrier rollers 32 is provided below the upper strand 311, which carry the weight of the conveyor rollers 20 and of the loads conveyed on the roller conveyor 1. The carrier rollers 32 and their fixation will be described in detail with reference to the following figures.

Due to the different arrangements of the drive motor 38, the two embodiments differ in particular with respect to the course of the lower strand 312.

In the embodiment with the lying drive motor 38, which is illustrated in FIGS. 1a, 1b, and 1c, only one lower strand idler pulley 39 is required and one of the idler pulleys 36 is designed as a driving roller 37. Here, the lower strand idler pulley 39 is arranged such that a tangential course of the first part of the lower strand 313 and of the second part of the lower strand 315 to the curve course is ensured. Thus, it is enabled that the lower strand 312 runs off or onto the idler pulleys 361, 362, respectively, both from the first idler pulley 361 and from the second idler pulley 362 perpendicular to the course of the rotation axes of the idler pulleys 361, 362. In this way, the friction between the first idler pulley 361 and the first part of the lower strand 313 as well as the friction between the second idler pulley 362 and the second part of the lower strand 315 is minimized. Therefore, a minimum number of idler pulleys is sufficient in this embodiment, which results in particularly low energy consumption and low noise emissions.

In the embodiment with the upright drive motor 38, which is illustrated in FIGS. 2a, 2b, and 2c, two lower strand idler pulleys 39 are provided, which flank the driving roller 37, so that a wrap angle of the drive belt 31 around the driving roller 37, which is required for force transmission, is ensured. In the illustrated embodiment, a further lower strand idler pulley 39 is provided in order to avoid contact of the lower strand 312 with the inner profile 12. In this embodiment as well, the lower strand idler pulleys 39 are arranged such that a tangential course of the first part of the lower strand 313 and of the second part of the lower strand 315 is ensured. Accordingly, an oblique course of the drive belt 31 to one of the idler pulleys 361, 362 is prevented in this case as well. The perpendicular arrangement of the drive motor 38 results in little space requirement in the radial direction of the curve course. Therefore, clearly narrower roller tracks can be realized in this embodiment.

Depending on the space requirement, further embodiments in which the drive motor 38 can e.g. be oblique are conceivable as well. Here, the round-section belt enables the most varied configurations due to its ability to be redirected in different directions.

In the illustrated embodiments, the drive belts 31 are made of a material comprising polyurethane. PU belts with or without core can be used here. Such PU belts, in particular the PU belts without core, exhibit good elastic properties and can be expanded up to 6% depending on the embodiment. Due to this elasticity, certain tolerances in the arrangement of the different idler pulleys 36 and the lower strand idler pulleys 38 can be compensated for owing to the expandability of the drive belt 31, so that this embodiment can do without a complex belt tensioning device.

With reference to the remaining figures, the conveyor-section bearing elements 50 fixed to the inner profile 12 of the conveyor frame 10, the curve outer side conveyor-section bearing elements 60, and the fixation thereof will be described in the following.

Figure 4A:
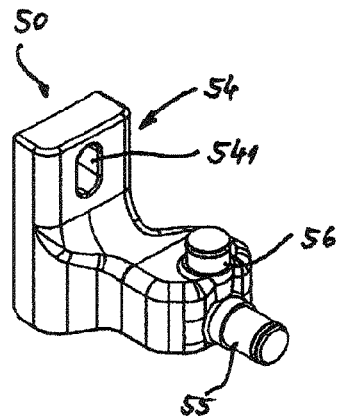
FIGS. 4a to 4c show different views of a conveyor-section bearing element.
Figure 4B:
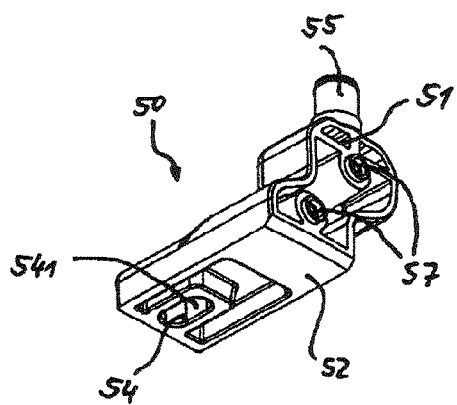
Figure 4C:
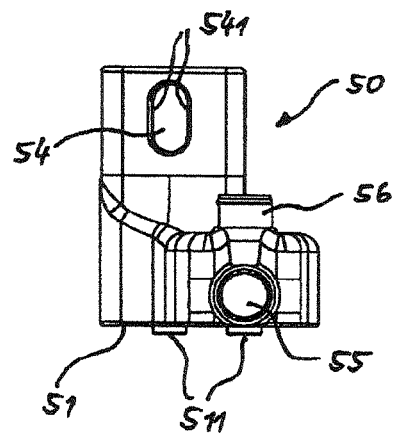
Figure 6:
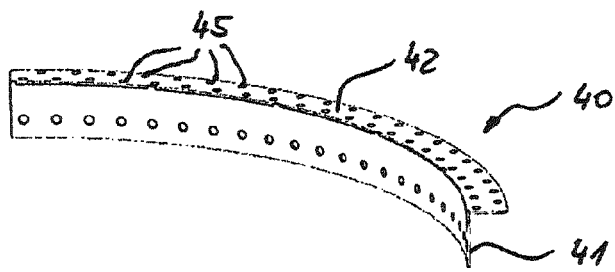
FIG. 6 shows a fixing element for fixation of the conveyor-section bearing elements.

FIG. 4a shows a conveyor-section bearing element 50 in perspective view from obliquely above. The same conveyor-section bearing element 50 is shown in FIG. 4b and FIG. 4c in perspective view from obliquely below and in side view, respectively. The conveyor-section bearing element 50 has an elongated bearing site 54. In the illustrated embodiment, the bearing site 54 is formed as a through hole. The bearing site 54 has two substantially parallel bearing site boundary surfaces 541. The bearing site boundary surfaces 541 have a distance to each other which substantially corresponds to the diameter of an axle end 22 of a conveyor roller 20. When one axle end 22 is inserted in the bearing site 54, the axle end can move up or down in the bearing site 54 and is fixed in the lateral direction via the bearing site boundary surfaces 541.

Figure 5:
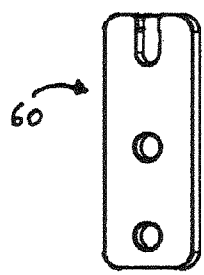
FIG. 5 shows a curve outer side bearing element.

Curve outer side conveyor-section bearing elements 60 can be provided on the other side of the respective conveyor roller 20. These curve outer side conveyor-section bearing elements 60 can have a configuration as shown in FIG. 5. Accordingly, such a curve outer side conveyor-section bearing element 60 can have a bearing site open at the top and one or more fixing holes. The bearing element can be screwed to the outer profile 13 via the fixing holes. This type of fixation is only exemplary. Other types of fixation are conceivable as well. The bearing site open at the top enables an easy assembly of the conveyor rollers, according to which one axle end 22 is inserted in the bearing site 54 of the conveyor-section bearing element 50 first, and then the opposite axle end of the conveyor roller 20 is swiveled into the bearing site, open at the top, of the curve outer side conveyor-section bearing element 60.

At least one fixing element 40 is provided for fixation of the conveyor-section bearing element 50. In the illustrated embodiment, the fixing element 40 has a fixing area 41 for fixing the fixing element 40 to the inner profile 12. Further, the fixing element 40 has a substantially horizontally extending resting area 42. For example, the fixing element 40 can be designed as a bent sheet metal part. It is also conceivable that the fixing area 41 and the resting area 42 are produced as two separate parts, which are subsequently connected to each other by welding, for example.

A plurality of conveyor-section bearing elements 50 can be placed on the resting area 42 of the fixing element 40. Here, the console contact surfaces 51 of the conveyor-section bearing elements 50 can rest on the resting area 42 of the fixing element 40 in a smooth and planar manner, so that an equidistant distance of the lower areas of the bearing sites 54 to the resting area 42 is ensured. Moreover, the conveyor-section bearing elements 50 can each have position protrusions 511 in the area of the console contact surface 51, which can engage corresponding position recesses 45 provided in the resting area 42 of the fixing element 40. A defined position of the conveyor-section bearing element 50 can be ensured by the position recesses 45 and the corresponding position protrusions 511. In the illustrated embodiment, two position protrusions 511 per conveyor-section bearing element 50 are provided. However, a conveyor-section bearing element 50 can also have only one position protrusion 511. In this case, further elements can serve to specify a defined position of the conveyor-section bearing element 50. For example, a side profile contact surface 52 can be provided on the backside of the conveyor-section bearing element 50, which can be brought into contact with the inner profile 12.

As can be seen in the figures, each conveyor-section bearing element 50 has a carrier roller axle 55 and a support roller axle 56. Both the carrier roller axle 55 and the support roller axle 56 are arranged along the course of the upper strand 311 in a manner displaced by a specific distance in relation to the position of the bearing site 54. In the illustrated embodiment, the specific distance corresponds to half the distance of a conveyor roller 20 to the neighboring conveyor roller 20. By means of this configuration, is can be achieved that carrier rollers 32 and support rollers 33, which are placed onto the corresponding carrier roller axles 55 and support roller axles 56, respectively, are each positioned approximately centrally between two conveyor rollers 20. By means of this configuration, a favorable course of the upper strand 311 with respect to friction and wear is achieved.

Figure 3A:
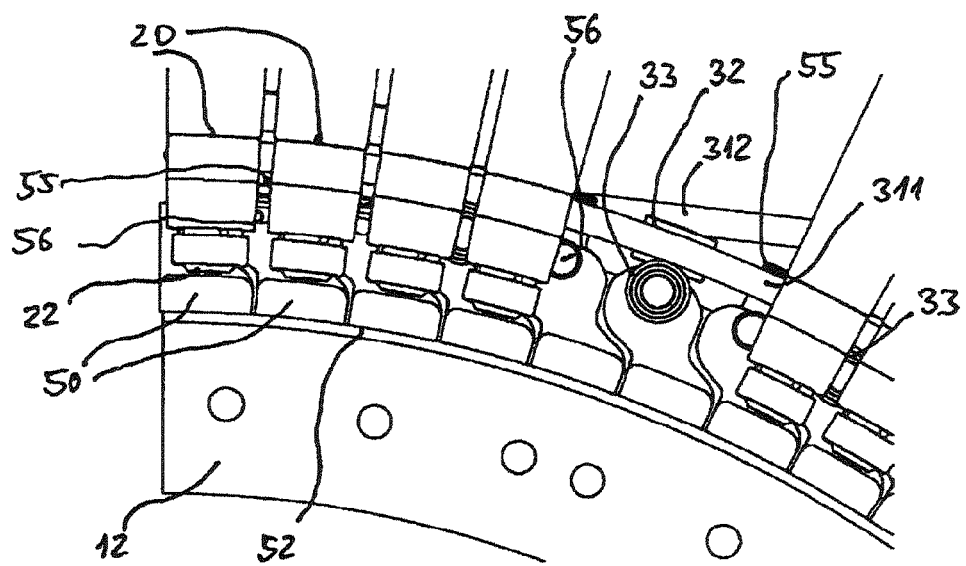
FIG. 3a shows a part of a view of the roller conveyor in a viewing direction perpendicular to the conveying plane of the roller conveyor from the top.
Figure 3B:
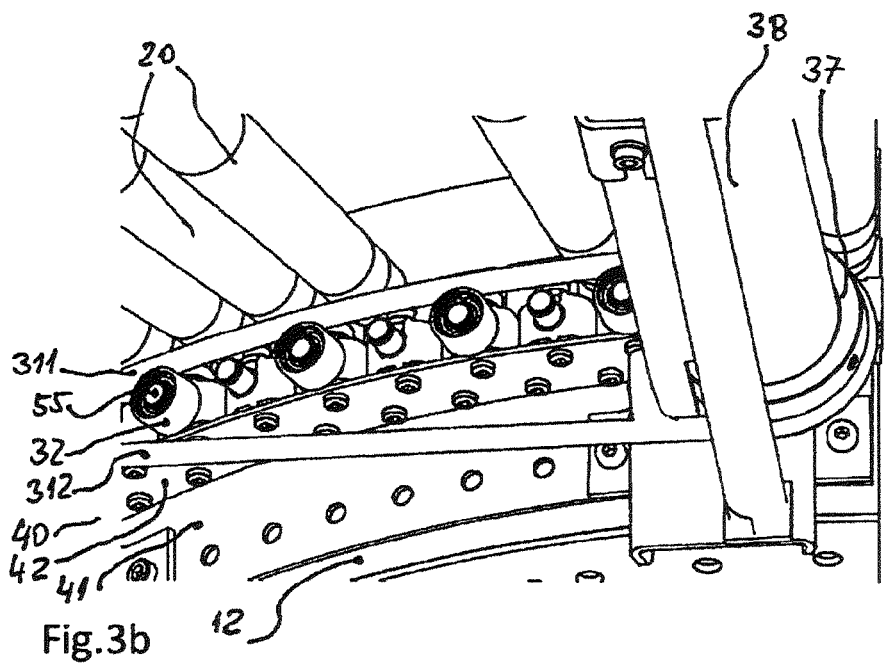
FIG. 3b shows the area illustrated in FIG. 3a in perspective view from obliquely below.

The course of the upper strand 311 in relation to the neighboring components is illustrated more precisely in FIGS. 3a and 3b. FIG. 3a shows a view of the roller conveyor in a viewing direction perpendicular to the conveying plane of the roller conveyor from the top. FIG. 3b shows the same area in perspective view obliquely from below.

It can be seen particularly well in FIG. 3b that the carrier rollers 32 are formed as carrier rollers 32 without ribs, which have a generally cylindrical carrier roller surface. This configuration of the carrier rollers 32, which do not have ribs on the curve outer side of the respective carrier roller, has the advantage of a particularly simple assembly of the drive belt, which does not have to be forced through the narrow gap between carrier roller rib and conveyor rollers when being assembled. In connection with the illustrated embodiments of the lower strand guidance with lying or upright drive motor, the drive belt can be replaced in case of damage without having to demount components of the roller conveyor. Since the PU belt used in the embodiment is elastic and thus no tensioning device is required, no separate adjustment of the drive belt tension is required in the assembly. An exchange of the drive belt can therefore be performed in a very short time. Downtimes can be reduced to a minimum.

These figures show that the conveyor-section bearing elements 50 are screwed to the resting area 42 of the fixing element 40 by two screws each. To this end, two fixing holes 57 are provided in the conveyor-section bearing elements 50 each. The position protrusions 511 are formed as collar-shaped areas around the fixing holes 57 and project slightly beyond the console contact surface 51. Accordingly, the position protrusions 511 can be inserted in the position recesses 45 and the conveyor-section bearing elements 50 can then be fixed to the fixing element 40 by screws.

In the assembled state, the conveyor-section bearing elements 50 are arranged such that the carrier roller axles 55 extend substantially in the horizontal direction along a radius ray extending from the curve center through the respective carrier roller axle. The support roller axles 56 have an upright, substantially vertical position. Both the carrier rollers 32 and the support rollers 33 have a circular-cylindrical shape, so that the drive belt 31 having the round cross section contacts the rollers only punctually. Since the points where the carrier rollers 32 contact the drive belt 31 are half the diameter of the drive belt 31 further away from the curve center than the points where the support rollers 33 contact the drive belt 31, the drive belt, which moves along a circular path around the curve center, has different speeds in these points, so that the support rollers 33 rotate slightly slower than the carrier rollers 32. Therefore, supporting the drive belt 31 via separate carrier rollers 32 and support rollers 33, in contrast to supporting it via a roller having a concave surface or a carrier roller having a side rib, reduces a rolling transmission of the drive belt at certain surface areas.

Supporting the cylindrical support rollers 33 vertically prevents the pressing force between drive belt 31 and support roller 33 from having a component toward the rotation axis of the support roller 33. Therefore, additional fixing means preventing the drive belt 31 from slipping off the support rollers 33 upward are not required. For this purpose, the weight of the conveyor rollers 20 is also sufficient in the case of strand vibrations, so that in this embodiment a conveyor-section bearing element 50 having a bearing site 54 open at the top could be used as well. In the presently described conveyor-section bearing element 50, however, the bearing site 54 is formed as an elongated hole closed at the top, so that the axle end 23 can only move up until it abuts on the upper end of the bearing sites. In this upper position, the surface area of the conveyor roller 20 arranged on the drive belt side prevents the drive belt from diverting upward, which might cause the drive belt to slip off the support rollers 33.

The idler pulleys 36, one idler pulley configured as a driving roller 37 being shown in FIG. 3b, have a concave surface in the illustrated embodiment, so that the drive belt 31 is securely guided in the wrap area. In particular if one of the idler pulleys 36 is formed as the driving roller 37, as this can be the case with a lying drive motor 38, such a surface configuration makes sense since here also the force transmission between driving roller 37 and drive belt 31 is improved.

The invention claimed is:

1. A conveyor-section bearing element (50) for fitting to a conveyor frame (10) of a roller conveyor (1), the conveyor-section bearing element (50), comprising:
   at least one bearing site (54) for bearing a conveyor roller (20) on the conveyor frame, and
   at least one of a carrier roller axle (55) and a support roller axle (56) for bearing a carrier or support roller (32; 33), wherein
   the conveyor-section bearing element (50), including the at least one bearing site (54) and the at least one of the carrier roller axle (55) and the support roller axle (56) is formed integrally as an injection-molded part.

2. The conveyor-section bearing element (50) of claim 1, wherein the bearing site (54) is an elongated recess to enable a floating support.

3. The conveyor-section bearing element (50) of claim 1, wherein the bearing site (54) has an elongated shape and is closed at the top.

4. The conveyor-section bearing element (50) of claim 1, wherein the at least one of the carrier roller axle (55) and the support roller axle (56) is the carrier roller axle (55) and extends in a direction such that a rotation axis of the carrier roller (32) to be arranged on the carrier roller axle (55) extends substantially in parallel with a rotation axis of the conveyor roller (20) to be supported in the bearing site (54).

5. The conveyor-section bearing element (50) of claim 1, wherein the at least one of the carrier roller axle (55) and the support roller axle (56) is the support roller axle (56), and the support roller axle (56) extends in a direction such that a rotation axis of a support roller (33) to be arranged on the support roller axle (56) extends substantially perpendicular to a conveying plane.

* * * * *